United States Patent
Kim et al.

(10) Patent No.: US 8,834,000 B2
(45) Date of Patent: Sep. 16, 2014

(54) LIGHT-SOURCE UNIT, BACK-LIGHT UNIT HAVING THE SAME, AND DISPLAY DEVICE HAVING THE SAME

(75) Inventors: Kyung-Min Kim, Asan-si (KR); Seung-Hwa Ha, Cheongju-si (KR); Seong-Yong Hwang, Asan-si (KR); Youra Kim, Pohang-si (KR); Seki Park, Asan-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 236 days.

(21) Appl. No.: 13/360,112

(22) Filed: Jan. 27, 2012

(65) Prior Publication Data

US 2013/0058126 A1 Mar. 7, 2013

(30) Foreign Application Priority Data

Sep. 1, 2011 (KR) .......................... 10-2011-0088675

(51) Int. Cl.
*F21V 7/06* (2006.01)
*G02F 1/1335* (2006.01)
*G09F 3/14* (2006.01)
*F21V 7/00* (2006.01)
*G09F 13/04* (2006.01)
*G09F 13/14* (2006.01)

(52) U.S. Cl.
CPC ............ *G02F 1/133615* (2013.01); *G09F 3/14* (2013.01); *G09F 2013/049* (2013.01); *G09F 2013/145* (2013.01)
USPC ............................. 362/609; 362/612; 362/634

(58) Field of Classification Search
USPC .................................. 362/600, 602, 606–634
See application file for complete search history.

(56) References Cited

U.S. PATENT DOCUMENTS

| | | | | |
|---|---|---|---|---|
| 6,641,284 | B2 * | 11/2003 | Stopa et al. | 362/240 |
| 7,077,554 | B2 * | 7/2006 | Kim et al. | 362/603 |
| 7,407,307 | B2 * | 8/2008 | Hiratsuka | 362/304 |
| 7,407,313 | B2 * | 8/2008 | Schardt et al. | 362/609 |
| 7,473,019 | B2 * | 1/2009 | Laski | 362/612 |
| 2005/0243576 | A1 | 11/2005 | Park et al. | |
| 2007/0171676 | A1 * | 7/2007 | Chang | 362/613 |

FOREIGN PATENT DOCUMENTS

| | | |
|---|---|---|
| JP | 09-083018 | 3/1997 |
| KR | 10-0890600 | 3/2009 |
| KR | 10-2011-0006957 | 1/2011 |

OTHER PUBLICATIONS

English Abstract for Publication No. 09-083018.
English Abstract for Publication No. 10-2008-0113312 (for 10-0890600).
English Abstract for Publication No. 10-2011-0006957.

* cited by examiner

*Primary Examiner* — Karabi Guharay
*Assistant Examiner* — Nathaniel Lee
(74) *Attorney, Agent, or Firm* — F. Chau & Associates, LLC

(57) ABSTRACT

A light-source unit for providing light to a display panel includes at least one light-source. The at least one light-source is mounted in a circuit board. A body portion having a housing space houses the circuit board on which the at least one light-source is mounted. A reflection portion reflects light emitted from the at least one light-source. The reflection portion has a parabola shape. The light is reflected by the reflection portion to proceed straight and in a direction perpendicular to a direction that the light is emitted from the at least one light-source.

22 Claims, 8 Drawing Sheets

LIGHT-SOURCE UNIT, BACK-LIGHT UNIT HAVING THE SAME, AND DISPLAY DEVICE HAVING THE SAME

CROSS-REFERENCE TO RELATED APPLICATIONS

This application relies for priority upon Korean Patent Application No. 10-2011-0088675, filed on Sep. 1, 2011, the contents of which are herein incorporated by reference in its entirety.

BACKGROUND

1. Technical Field

The present invention relates to a light-source unit, and more specifically, to a light source unit, a back-light unit having the light source unit, and a display device having the back-light unit.

2. Discussion of the Related Art

A display panel such as a liquid crystal display panel or an electrophoretic display panel does not emit light itself. Accordingly, a display device including such a display panel makes use of a light-source for emitting light to the display panel, for example, a back-light unit.

The back-light unit has a light-source emitting light and a light guide plate guiding the light emitted from the light-source toward the display panel.

The shape of the light guide plate may be adversely affected by heat generated from the light-source. Additionally, the light guide plate may be expensive to produce and may greatly influence a manufacturing cost of the display device.

SUMMARY

Exemplary embodiments of the present invention provide a light-source unit with a high degree of straightness.

Exemplary embodiments of the present invention also provide a back-light unit that includes the light-source unit having a high degree of light uniformity even though a light guide plate is omitted.

Exemplary embodiments of the present invention provide a display device including the back-light unit.

In exemplary embodiments of the present invention, a light-source unit includes at least one light-source, a circuit board on which the light-source is mounted, a body portion having a housing space housing the circuit board on which the light-source is mounted, and a reflection portion reflecting light emitted from the light-source. A cross-section of the reflection portion, which is parallel to a direction in which the light in the light-source is emitted, may have a parabola shape, and the light may be reflected by the reflection portion to proceed straight.

The parabola shape of the reflection portion may be represented as the following formula 1.

$$(y-\beta)^2 = 4p(x-\alpha) \quad \text{[Formula 1]}$$

where an x-axis direction is a direction of a center axis of the light-source, a y-axis direction is a direction perpendicular to the direction of the center axis, the β is a distance between a center point and a focal point of a parabola, the α is an x-coordinate of the focal point of the parabola, and the p is a curvature of the parabola.

An angle between the center axis and an imaginary line extending from an end of the reflection portion outputting the light to the center of the light-source may be equal to or less than a half-power angle of the light-source.

The light-source unit may further include a lens portion disposed at an end of the reflection portion along a direction outputting the light.

In exemplary embodiments of the present invention, a back-light unit includes the light-source unit and a reflection sheet reflecting the light outputted from the light-source unit. The reflection sheet may be inclined with respect to a direction in which the light in the light-source unit is outputted.

In exemplary embodiments of the present invention, a display device includes the back-light unit, a display panel displaying an image using light provided from the back-light unit, and a lower cover and an upper cover supporting the display panel.

The lower cover may include a bottom portion and a plurality of sidewalls extending from the bottom portion to bend toward the upper cover. A thickness of the bottom portion in a region adjacent to a side of the bottom portion, at which the light-source unit is disposed, may be smaller than a thickness of the bottom portion in a region adjacent to another side of the bottom portion parallel to the side.

The lower cover may include a bottom portion and a plurality of sidewalls extending from the bottom portion to bend toward the upper cover. The light-source unit may include a pair of light-source units disposed adjacent to two parallel sides of the bottom portion, respectively. A thickness of the bottom portion in a center region between the two sides may be greater than a thickness of the bottom portion in regions adjacent to the two sides.

BRIEF DESCRIPTION OF THE DRAWINGS

The embodiments of the present invention will become more apparent in view of the attached drawings and accompanying detailed description.

DETAILED DESCRIPTION

Hereinafter, exemplary embodiments of the present invention will be explained in detail with reference to the accompanying drawings.

Figure 1:
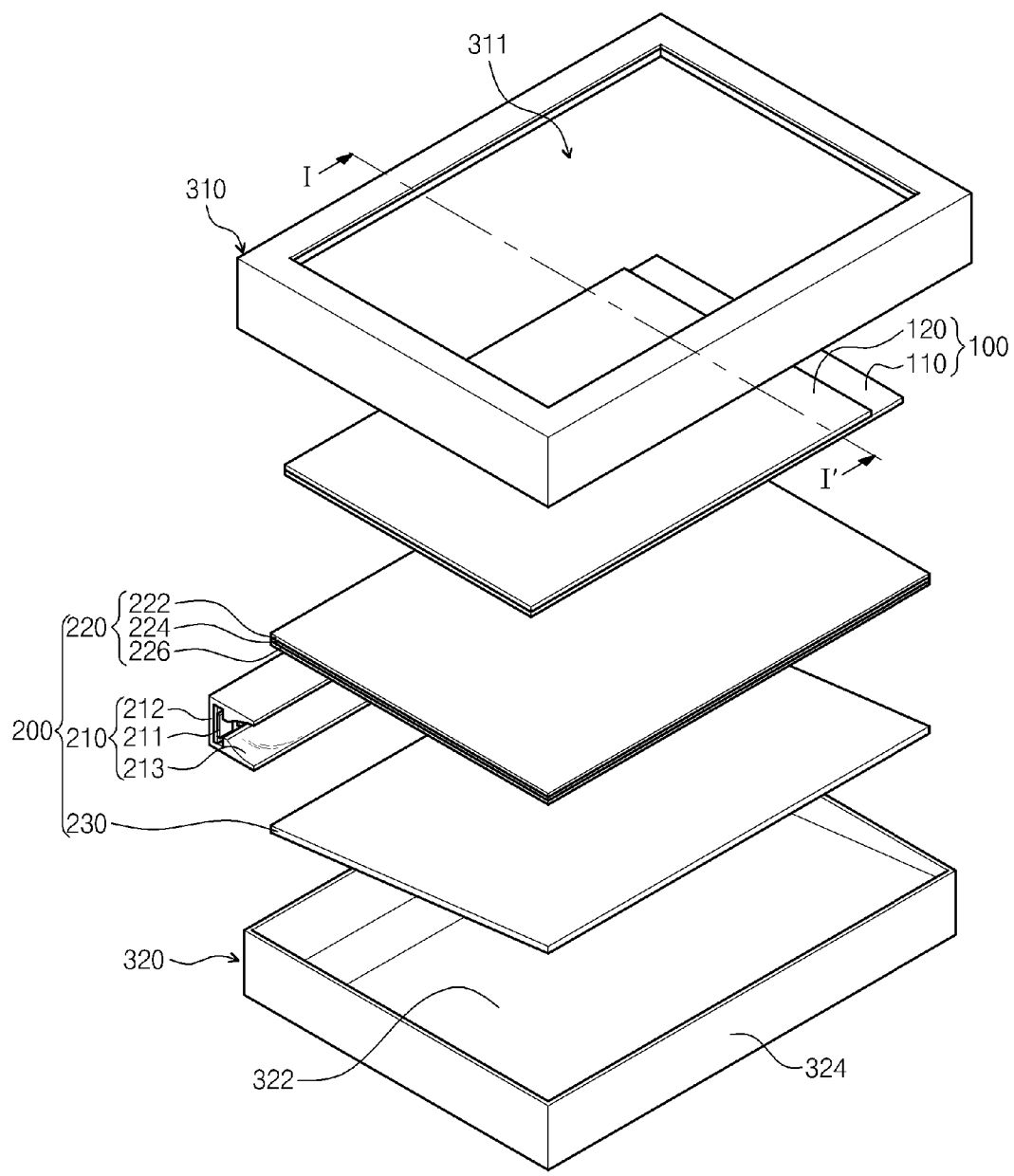
FIG. 1 is an exploded perspective view showing a display device according to an exemplary embodiment of the present invention.
Figure 2:
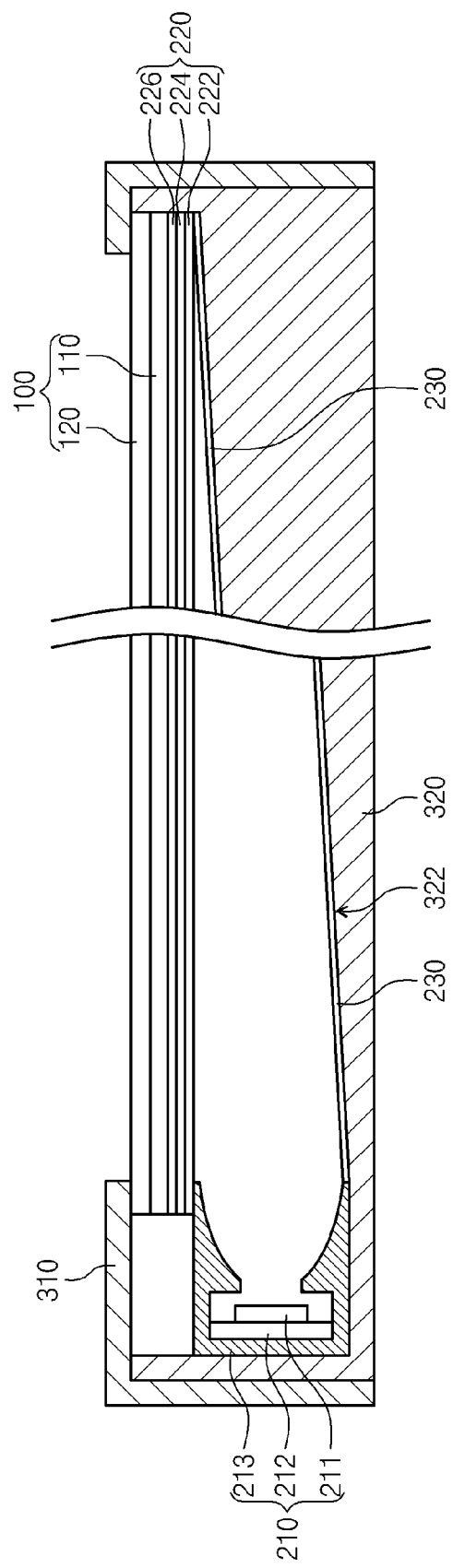
FIG. 2 is a cross-sectional view taken along a line I-I' of FIG. 1.

FIG. 1 is an exploded perspective view showing a display device according to an exemplary embodiment of the present invention and FIG. 2 is a cross-sectional view taken along a line I-I' of FIG. 1.

Referring to FIGS. 1 and 2, a display device according to an exemplary embodiment of the present invention includes a display panel 100, a back-light unit 200, an upper cover 310, and a lower cover 320.

Various display panels such as a liquid crystal display panel (LCD) or an electrophoretic display panel (EDP) may be used as the display panel 100. However, the disclosure may describe the use of the LCD as an example.

The display panel 100 has a rectangular plate-like shape having a pair of long sides and a pair of short sides. The display panel includes an array substrate 110, an opposite substrate 120 opposite to the array substrate 110, and a liquid crystal layer (not shown) formed between the array substrate 110 and the opposite substrate 120.

According to an embodiment of the present invention, the array substrate 110 may have a plurality of pixels (not shown) arranged in matrix form. Each of the pixels has a pixel electrode (not shown). A gate line (not shown) and a data line (not shown) may be disposed around the pixel electrode. The gate line extends in a first direction (e.g. a direction parallel to an edge of the array substrate 110) and the data line extends in a second direction perpendicular to the first direction. Additionally, each of the pixels is provided with a thin film transistor electrically connected to the gate line, the data line, and the pixel electrode. The thin film transistor switches a driving signal providing to a corresponding pixel electrode.

A driver integrated circuit (IC) (not shown) may be provided at a side of the array substrate 110. Signals of various kinds are inputted to the driver IC. The signals may be provided from an external source. The drive IC outputs a driving signal driving the display panel 100 in response to the inputted signals.

The opposite substrate 120 may include a RGB color filter (not shown) realizing a predetermined color using light, and a common electrode (not shown) formed on the RGB color filter and opposite to the pixel electrode on a surface thereof. The RGB color filter may be formed by a thin film process. The color filter formed on the opposite substrate 120 is explained as an example. However, exemplary embodiments of the present invention are not limited to this configuration. For example, the color filter may be formed on the array substrate 110.

Since the liquid crystal layer is arranged in a desired direction by voltages applied to the pixel electrode and the common electrode, a transmittance of light provided from the back-light unit 200 is precisely affected, so that the display panel 100 displays an image.

The back-light unit 200 is provided under the display panel 100. The back-light unit 200 includes a light-source unit 210, an optical member 220, and a reflection sheet 230.

The light-source unit 210 is provided under a single side of the display panel 100. The light-source unit 210 includes a light-source 211, a printed circuit board (PCB) 212, and a body portion 213.

The light-source 211 is supplied with a power source to generate light. The light-source 211 is mounted on the PCB 212, and the PCB 212 provides the power source to the light-source 211.

Figure 3:
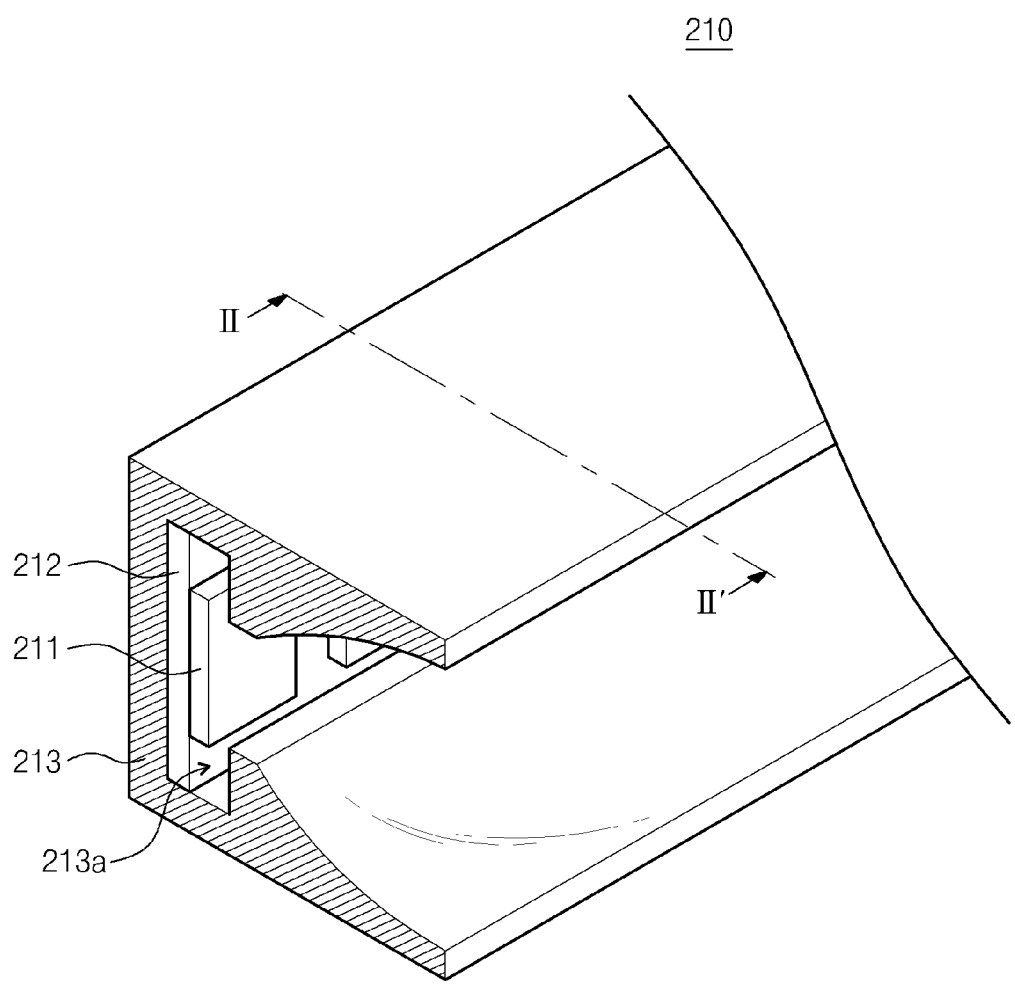
FIGS. 3, 5, 6, and 7 are perspective views showing light-source units capable of being applied to a display device according to an exemplary embodiment of the present invention.

The body portion 213 has a housing space 213A (FIG. 3) for housing the PCB 212 on which the light-source 211 is mounted. The body portion 213 includes a reflection portion 213B reflecting the light emitted from the light-source 211.

The optical member 220 is disposed under the display panel 100. The optical member 220 controls the light outputted from the light-source unit 210 to provide the light to the display panel 100. The optical member 220 includes a diffusion sheet 222, a prism sheet 224, and a protection sheet 226 which are sequentially stacked. The protection sheet 226 may be closest to a bottom surface of the display panel 100. The diffusion sheet 222 diffuses light outputted from the light-source unit 210. The prism sheet 224 focuses light diffused in the diffusion sheet 222 in a direction perpendicular to a flat surface of the display panel 100. Light transmitted through the prism sheet 224 is perpendicularly incident to the display panel 100. The protection sheet 226 is disposed on the prism sheet 224. The protection sheet 226 protects the prism sheet 224 from an external impact.

According to exemplary embodiments of the present invention, the optical member 220, including one diffusion sheet 222, one prism sheet 224, and one protection sheet 226, is explained as an example. However, the invention is not limited to this configuration. Within the optical member 220, at least one of the diffusion sheet 222, the prism sheet 224, and the protection sheet 226 may be provided in plural and may be stacked accordingly. Any one of the diffusion sheet 222, the prism sheet 224, and the protection sheet 226 may be omitted as necessary. For example, the optical member 220 may use two stacked prism sheets 224.

The reflection sheet 230 is disposed on the lower cover 320. The reflection sheet 230 reflects light outputted from the light-source unit 210 to change a path of the light toward the display panel 100. The reflection sheet 230 includes a material reflecting light.

Additionally, the reflection sheet 230 may be disposed to be inclined with respect to a direction in which the light is outputted from the light-source unit 210. Thus, the light outputted from the light-source unit 210 may be uniformly provided to the display panel 100.

The upper cover 310 is disposed over the display panel 100 and the upper cover 310 has a shape corresponding to a shape of the display panel 100. The upper cover 310 has a display window 311 exposing a display region of the display panel 100. Additionally, the upper cover 310 includes a top surface supporting a front edge of the display panel 100, and a plurality of upper cover sidewalls extending from the top surface to bend toward the lower cover 320. The display panel 100 has a rectangular plate-like shape and the upper cover 310 may include four upper cover sidewalls. The upper cover 310 combines with the lower cover 320 to support the front edge of the display panel 100.

The lower cover 320 is disposed under the back-light unit 200. The lower cover 320 includes a bottom portion 322 corresponding to a shape of the display panel 100, and a plurality of sidewalls 324 extending from the bottom portion 322 to bend toward the upper cover 310. The display panel 100 has a rectangular shape and the lower cover 320 may includes four sidewalls 324. The lower cover 320 has an inner space housing the display panel 100 and the back-light unit 200 created by the bottom portion 322 and the sidewalls 324. The lower cover 320 combines with the upper cover 310 to house the display panel 100 and the back-light unit 200 in the inner space thereof, thereby supporting the display panel 100 and the back-light unit 200.

Additionally, a thickness of the bottom portion 322 in a region adjacent to one side (e.g. a side at which the light-source unit 210 is disposed) of two parallel sides is smaller than a thickness of the bottom portion 322 in a region adjacent to another side of the two sides and the lower cover 320 may be inclined.

The reflection sheet 230 is disposed at an incline with respect to the direction in which the light is outputted from the light-source unit 210.

Figure 4:
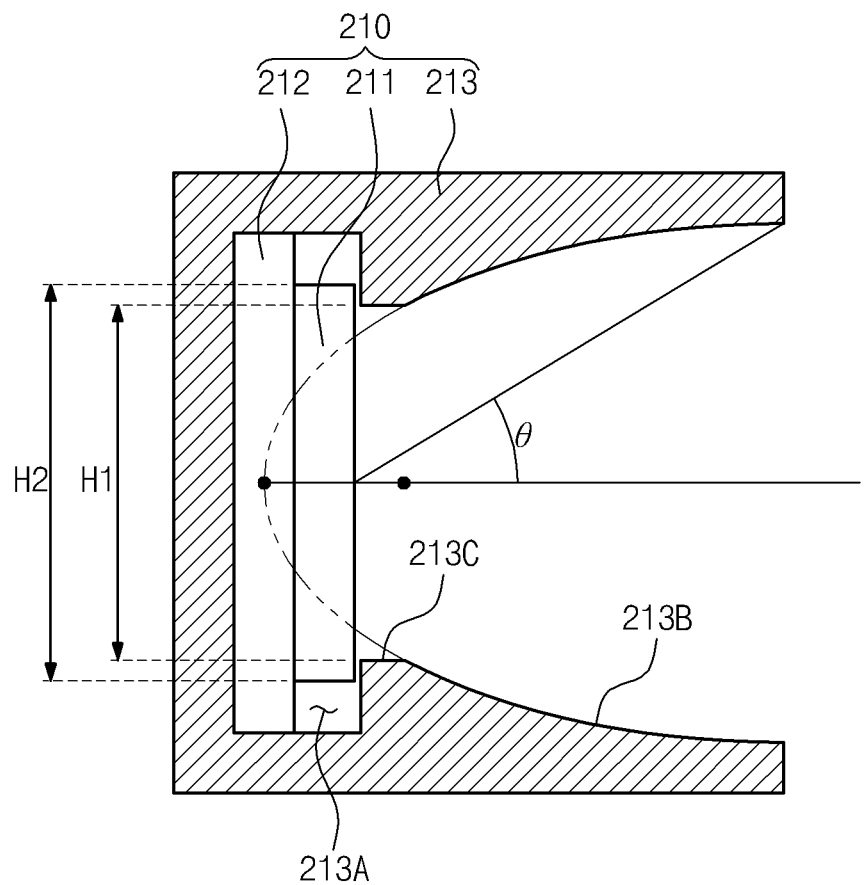
FIG. 4 is a cross-sectional view taken along a line II-II' of FIG. 3.

FIGS. 3, 5, 6, and 7 are perspective views showing light-source units capable of being applied to a display device according to an exemplary embodiment of the present invention. FIG. 4 is a cross-sectional view taken along a line II-II' of FIG. 3.

Referring to FIGS. 3 through 7, the light-source unit 210 applied to the display device according to an exemplary embodiment of the present invention may include a plurality of light-sources 211, a PCB 212 on which the plurality of light-source are mounted, and a body portion 213 having a space housing the PCB 212 on which the plurality of light-source are mounted.

The body portion 213 includes a material (e.g. aluminum (Al)) with excellent thermal conductivity and light reflectivity, thereby outputting heat generated from the light-sources 211 to the outside and reflecting the light emitted from the light-sources 211. Additionally, as shown in FIG. 4, the body portion 213 may include a housing space 213A housing the PCB 212 on which the light-sources 211 are mounted and a reflection portion 213B that reflects the light generated from the light-sources 211 to output. The housing space 213A is connected the reflection portion 213B through a neck portion 213C, and a height H1 of the housing space 213A opened by the neck portion 213C may be equal to or less than a height H2 or a width of the light-source 211. Thus, leakage light outputted through a region except the neck portion 213C may be blocked.

As shown in FIG. 4, a cross-section of the reflection portion 213B, which is parallel to an output direction of the light outputted from the light-source 211, may have a parabola-like shape. For example, the parabola-like shape of the reflection portion 213B is represented as the following formula 1.

$$(y-\beta)^2 = 4p(x-\alpha)$$ [Formula 1]

Where an x-axis direction is a direction of a center axis of the light-source 211, a y-axis direction is a direction perpendicular to the direction of the center axis, the β is a distance between a center point and a focal point of a parabola, the α is an x-coordinate of the focal point of the parabola, and the p is a curvature of the parabola.

An angle between the center axis of the light-source 211 and an imaginary line extending from an end of the reflection portion 213B outputting the light to the center of the light-source 211 is equal to or less than a half-power angle of the light-source 211. Where the light-source 211 outputs light in a direction of the center axis thereof, the half-power angle is an angle at which 50% of the light is outputted.

Figure 5:
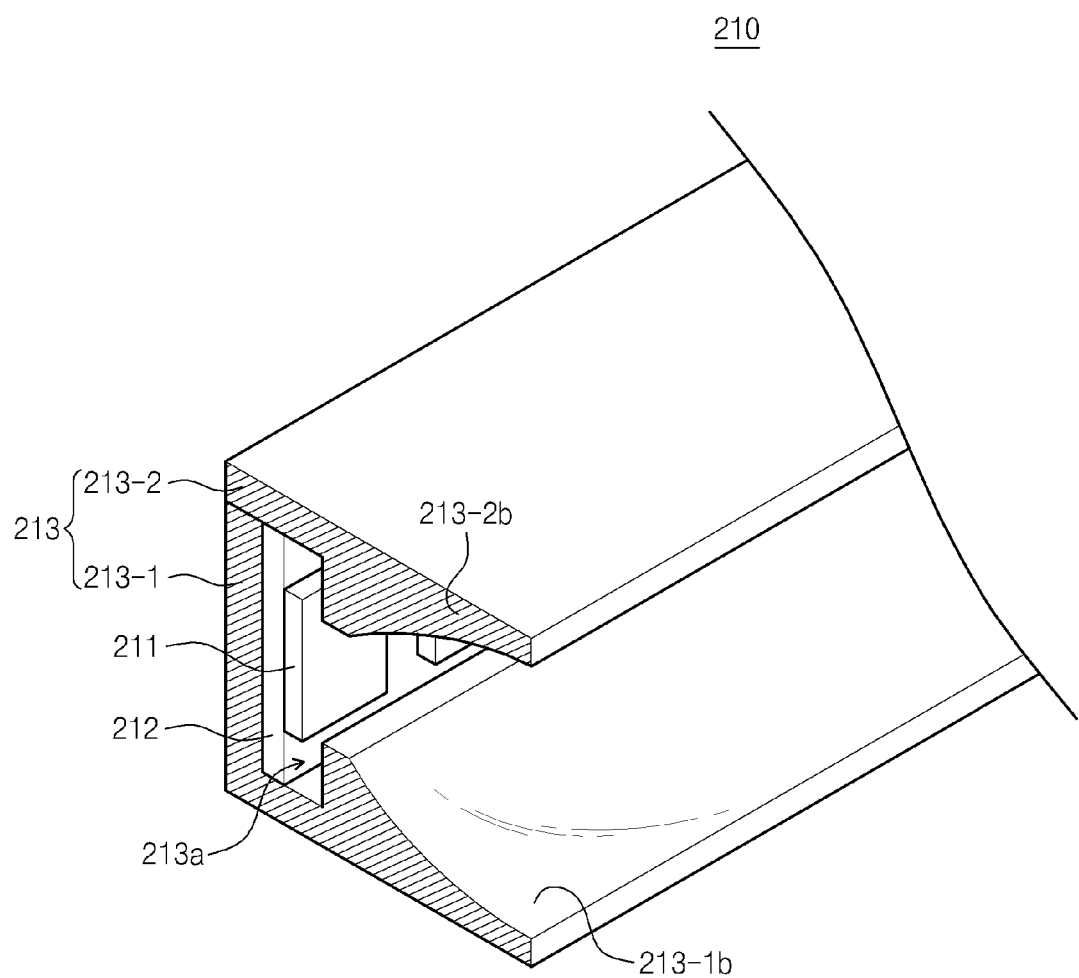

As shown in FIG. 5, the body portion 213 may include a first body 213-1 and a second body 213-2. The first body 213-1 may include a housing space 213A housing the PCB 212 on which the light-sources 211 are mounted and a first reflection portion which reflects the light generated from the light-source 211 to output. An upper side of the first body 213-1 is opened. The second body 213-2 may cover the upper side of the first body 212-1 and may include a second reflection portion which makes a pair with the second reflection portion to complete the reflection portion 213B.

The body portion 213 may include a lens 214 (FIG. 6) for straightening the light emitted from the light-source 211. The lens 214 may be disposed at an end of the reflection portion 213B along the direction light is output. The lens 214 refracts the light emitted from the light-source 211 and not reflected by the reflection portion 213B to proceed straight.

Figure 6:
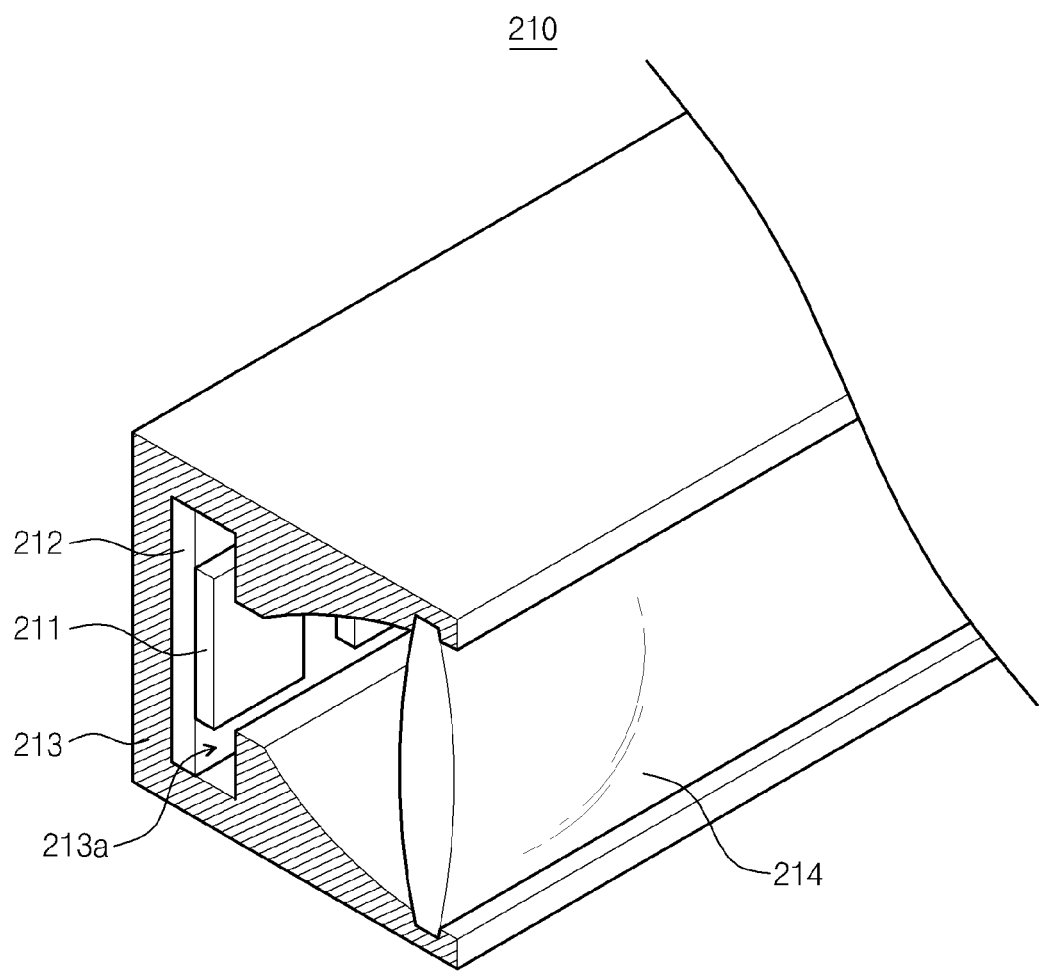
Figure 7:
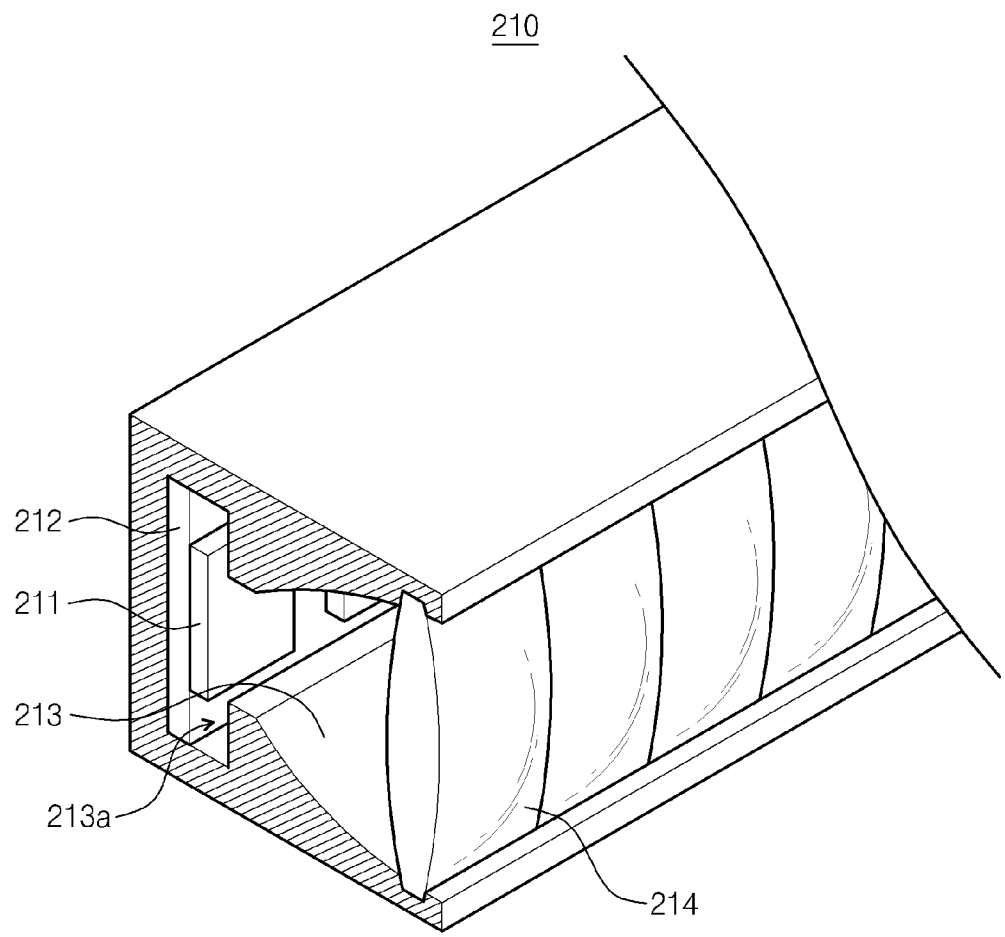

As shown in FIG. 6, the lens 214 may be one body-lens disposed at the end of the reflection portion 213B along the direction light is output. Alternatively, as shown in FIG. 7, the lens 214 may include a plurality of lenses that may be, for example, in one-to-one correspondence to the light-sources 211. The plurality of lenses may be disposed at the end of the reflection portion 213B along the direction light is output.

A general light emitting diode (LED) chip may be used as the light-source 211 and the light-source 211 emits light when the power source is applied to the light-source 211 from the PCB 212. The light-source 211 may be disposed between the center point and the focal point of the parabola of the reflection portion 213B, or at the focal point of the parabola.

The light-source 211 is mounted on a surface of the PCB 212 and the PCB 212 is connected to an external circuit (not shown) to apply the power source to the light-source 211. The light of the light-source 211 is controlled by the external circuit.

As described above, the light outputted from the light-source unit 210 has a high degree of straightness and is reflected by the inclined reflection sheet 230 and is guided toward the display panel 100. Thus, the display device does not require a light guide plate for guiding the light outputted from the light-source unit 210. Accordingly, since the light guide plate is omitted from the display device, it is possible to reduce the manufacturing cost of the display device.

Figure 8:
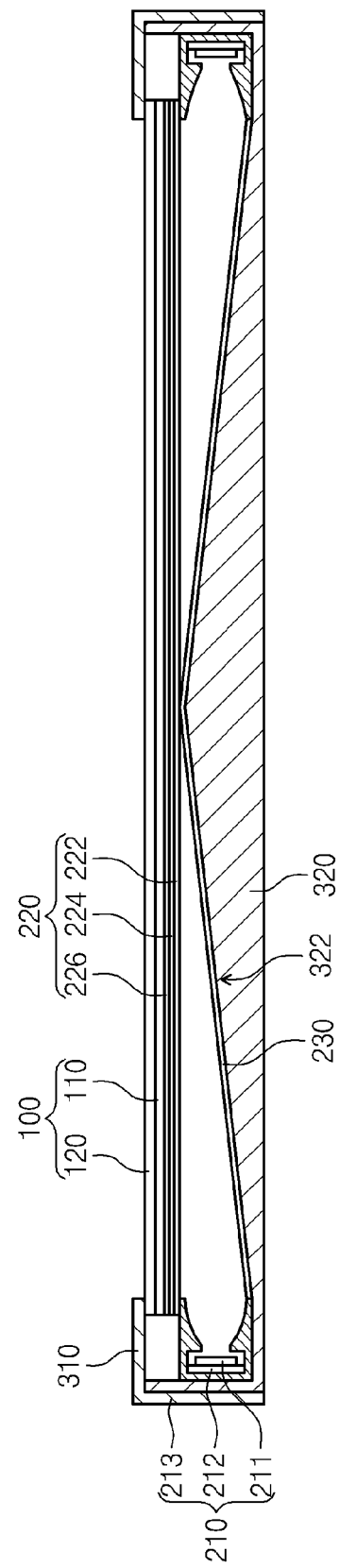
FIG. 8 is a cross-sectional view showing a display device according to an exemplary embodiment of the present invention.

Hereinafter, an exemplary embodiment of the present invention will be explained with reference to FIG. 8. In FIG. 8, the same elements as shown in FIGS. 1 through 7 will be indicated by the same reference numerals or the same reference designators. For the purpose of ease and convenience in explanation, the descriptions to the same elements as in FIGS. 1 through 7 will be omitted or mentioned briefly. Differences between embodiments in FIG. 8 and embodiments in FIGS. 1 through 7 will be mainly described.

FIG. 8 is a cross-sectional view showing a display device according to an exemplary embodiment of the present invention.

Referring to FIG. 8, a display device according to an exemplary embodiment of the present invention includes a display panel 100, a back-light unit, an upper cover 310, and a lower cover 320. The back-light unit includes light-source units 210, an optical member 220, and a reflection sheet.

The light-source units 210 may be disposed under any two parallel sides of the display panel 100, respectively. The light-source units 210 may be disposed adjacent to two parallel sides of the bottom portion 322 of the lower cover 320, respectively.

The reflection sheet 230 may be disposed on the bottom portion 322 of the lower cover 320.

A thickness of the bottom portion 322 of the lower cover 320 in a center region between the two sides, at which the light-sources units 210 are disposed, may be greater than a thickness of the bottom portion 322 in regions adjacent to the two sides thereof. Thus, a top surface of the bottom portion 322 of the lower cover 320 may be inclined. The top surface of the bottom portion 322 of the lower cover 320 may include a first portion having a positive gradient and a second portion having a negative gradient.

Accordingly, the light outputted from one of the light-source units 210 proceeds toward the other of the light-source units 210 and is reflected by the reflection sheet 230 to be directed toward the display panel 100.

The light-source unit described above has a high degree of straightness. Accordingly, the back-light unit and the display device including the light-source unit can have a high degree of light uniformity, so that display quality may be increased even though a light guide plate is omitted.

While the present invention has been described with reference to exemplary embodiments, it will be apparent to those skilled in the art that various changes and modifications may be made without departing from the spirit and scope of the present invention.

What is claimed is:

1. A light-source unit for providing light to a display panel, comprising:
    at least one light-source disposed so as not to overlap with a display panel in a plan view;

a circuit board on which the at least one light-source is mounted; and a body portion having a housing space housing the circuit board on which the at least one light-source is mounted, and a reflection portion reflecting light emitted from the at least one light-source, and wherein the body portion supports at least a portion of the display panel;

wherein the reflection portion has a portion having parabola shape; and wherein the light is reflected by the reflection portion to proceed straight.

2. The light-source unit of claim 1, wherein the parabola shape of the reflection portion is represented as: $(y-\beta)^2=4p(x-\alpha)$, where an x-axis direction is a direction of a center axis of the light-source, a y-axis direction is a direction perpendicular to the direction of the center axis, the $\beta$ is a distance between a center point and a focal point of a parabola, the $\alpha$ is an x-coordinate of the focal point of the parabola, and the p is a curvature of the parabola.

3. The light-source unit of claim 2, wherein an angle between the center axis and an imaginary line extending from an end of the reflection portion outputting the light to the center of the light-source is equal to or less than a half-power angle of the light-source.

4. The light-source unit of claim 2, wherein the light-source is disposed between the center point and the focal point of the parabola, or at the focal point of the parabola.

5. The light-source unit of claim 1, further comprising: a lens portion disposed at an end of the reflection portion along a direction in which the light is output.

6. The light-source unit of claim 1, wherein the housing space is connected to the reflection portion through a neck portion and a height of the housing space opened by the neck portion is equal to or less than a height or width of the light-source.

7. A back-light unit comprising:
a light-source unit; and
a reflection sheet reflecting light output from the light-source unit, and
wherein the light source unit comprises:
at least one light-source, disposed so as not to overlap with a display panel in a plan view;
a circuit board on which the at least one light-source is mounted; and
a body portion including a housing space housing the circuit board on which the light-source is mounted, and a reflection portion reflecting light emitted from the light-source,
wherein the body portion supports at lease a portion of the display panel; and
wherein the reflection portion has a parabola shape,
wherein the reflection sheet is inclined with respect to a direction in which the light of the light-source unit is outputted,
wherein the light is reflected by the reflection portion to proceed straight and the light is reflected by the reflection sheet to proceed in a direction perpendicular to a direction in which the light is emitted from the at least one light-source,
wherein the reflection sheet and the reflection portion are connected to each other smoothly such that at a point of intersection thereof, a thickness of the reflection sheet is equal to a thickness of the reflection portion, and
wherein the reflection sheet and the reflection portion are connected to each other smoothy such that a point where the reflection sheet and the reflection portion meet, a thickness of the reflection sheet is equal to a thickness of the reflection portion.

8. The back-light unit of claim 7, wherein the parabola shape of the reflection portion is represented as: $(y-\beta)^2=4p(x-\alpha)$, where an x-axis direction is a direction of a center axis of the light-source, a y-axis direction is a direction perpendicular to the direction of the center axis, the $\beta$ is a distance between a center point and a focal point of a parabola, the $\alpha$ is an x-coordinate of the focal point of the parabola, and the p is a curvature of the parabola.

9. The back-light unit of claim 8, wherein an angle between the center axis and an imaginary line extending from an end of the reflection portion outputting the light to the center of the light-source is equal to or less than a half-power angle of the light-source.

10. The back-light unit of claim 8, wherein the light-source is disposed between the center point and the focal point of the parabola, or at the focal point of the parabola.

11. The back-light unit of claim 7, wherein the body portion comprises:
a first body having the housing space housing the circuit board on which the light-source is mounted and a lower end of the reflection portion; and
a second body covering the first body and constituting an upper end of the reflection portion.

12. The back-light unit of claim 7, further comprising: a lens portion disposed at an end of the reflection portion along a direction in which the light is output.

13. The back-light unit of claim 12, wherein the at least one light-source is provided in plural; and wherein the lens portion includes a plurality of lenses in one-to-one correspondence to the plurality of light-sources.

14. A display device comprising:
a back-light unit including a reflection sheet;
a display panel displaying an image using light provided from the back-light unit; and
a lower cover and an upper cover supporting the display panel, wherein the back-light unit additionally comprises:
at least one light-source disposed so as nit to overlap with a display panel in a plan view;
a circuit board on which the at least one light-source is mounted; and
a body portion having a housing space housing the circuit board on which the at least light-source is mounted, and a reflection portion reflecting light emitted from the at least one light-source, the body portion supporting at least a portion of the display panel, and
wherein the reflection sheet reflects light outputted from the at least one light-source to direct the light toward the display panel;
wherein the reflection portion has a parabola shape;
wherein the light is reflected by the reflection portion to proceed straight and the light is reflected by the reflection sheet to proceed in a direction perpendicular to a direction that the light is emitted from the at least one light-source; and
wherein the reflection sheet and the reflection portion are connected to each other smoothly such that a point where the reflection sheet and the reflection portion meet, a thickness of the reflection sheet is equal to a thickness of the reflection portion.

15. The display device of claim 14, wherein the reflection sheet is inclined with respect to a direction in which the light in the light-source unit is outputted.

16. The display device of claim 15, wherein the parabola shape of the reflection portion is represented as: $(y-\beta)^2=4p(x-\alpha)$, where an x-axis direction is a direction of a center axis of the light-source, a y-axis direction is a direction perpendicular to the direction of the center axis, the $\beta$ is a distance between a center point and a focal point of a parabola, the $\alpha$ is an x-coordinate of the focal point of the parabola, and the p is a curvature of the parabola.

17. The display device of claim 16, wherein an angle between the center axis and an imaginary line extending from an end of the reflection portion outputting the light to the center of the light-source is equal to or less than a half-power angle of the light-source.

18. The display device of claim 16, wherein the light-source is disposed between the center point and the focal point of the parabola, or at the focal point of the parabola.

19. The display device of claim 15, wherein the lower cover includes a bottom portion, and a plurality of sidewalls extending from the bottom portion to bend toward the upper cover; and wherein a thickness of the bottom portion in a region adjacent to a side of the bottom portion, at which the light-source unit is disposed, is smaller than a thickness of the bottom portion in a region adjacent to another side of the bottom portion parallel to the side.

20. The display device of claim 15, wherein the lower cover includes a bottom portion, and a plurality of sidewalls extending from the bottom portion to bend toward the upper cover;

wherein the light-source unit includes a pair of light-source units disposed adjacent to two parallel sides of the bottom portion, respectively; and wherein a thickness of the bottom portion in a center region between the two sides is greater than a thickness of the bottom portion in regions adjacent to the two sides.

21. The display device of claim 14, further comprising: a lens portion disposed at an end of the reflection portion along a direction that the light is outputted.

22. A display device, comprising:
a display panel; and
a backlight unit providing light to the display panel, the backlight unit comprising:
a parabolic reflector;
a light source unit at one end of the parabolic reflector, the light source unit including a light source which is disposed so as not to overlap with a display panel in a plan view; and
an inclined reflective sheet at an opposite end of the parabolic reflector directing light emitted from the light source unit and the parabolic reflector evenly to a back surface of the display panel without traveling through a light guide plate,
wherein the inclined reflective sheet and the parabolic reflector portion are connected to each other smoothly such that a point where the inclined reflective sheet and the parabolic reflector portion meet, a thickness of the inclined reflective sheet is equal to a thickness of the parabolic reflector portion.

\* \* \* \* \*